Feb. 25, 1958
B. L. THIBODEAU
2,824,459
TRANSMISSION CONTROL APPARATUS
Filed July 3, 1956
3 Sheets-Sheet 1
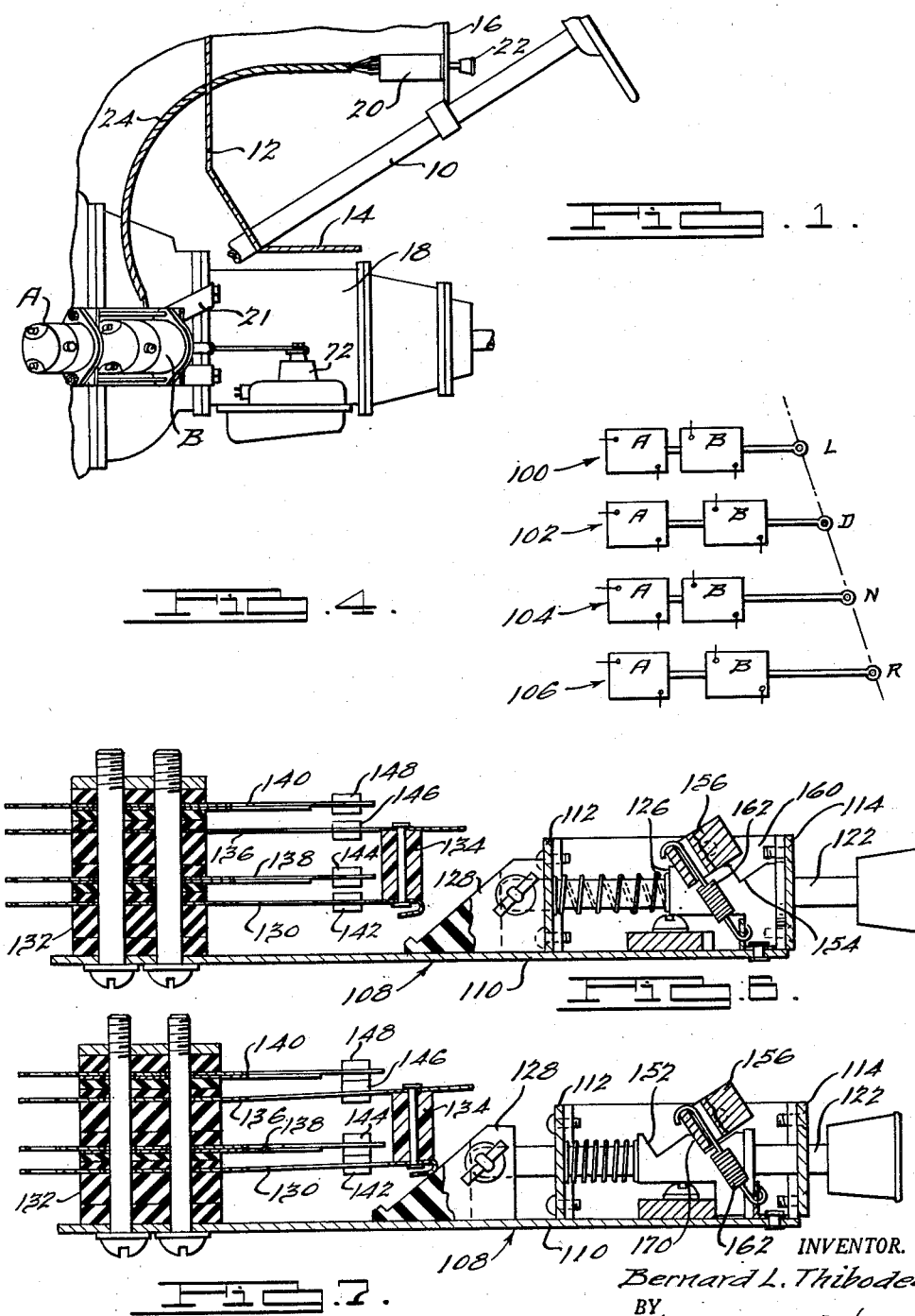
INVENTOR.
Bernard L. Thibodeau
BY
Harness and Harris
ATTORNEYS.

Feb. 25, 1958     B. L. THIBODEAU     2,824,459
TRANSMISSION CONTROL APPARATUS
Filed July 3, 1956     3 Sheets-Sheet 2
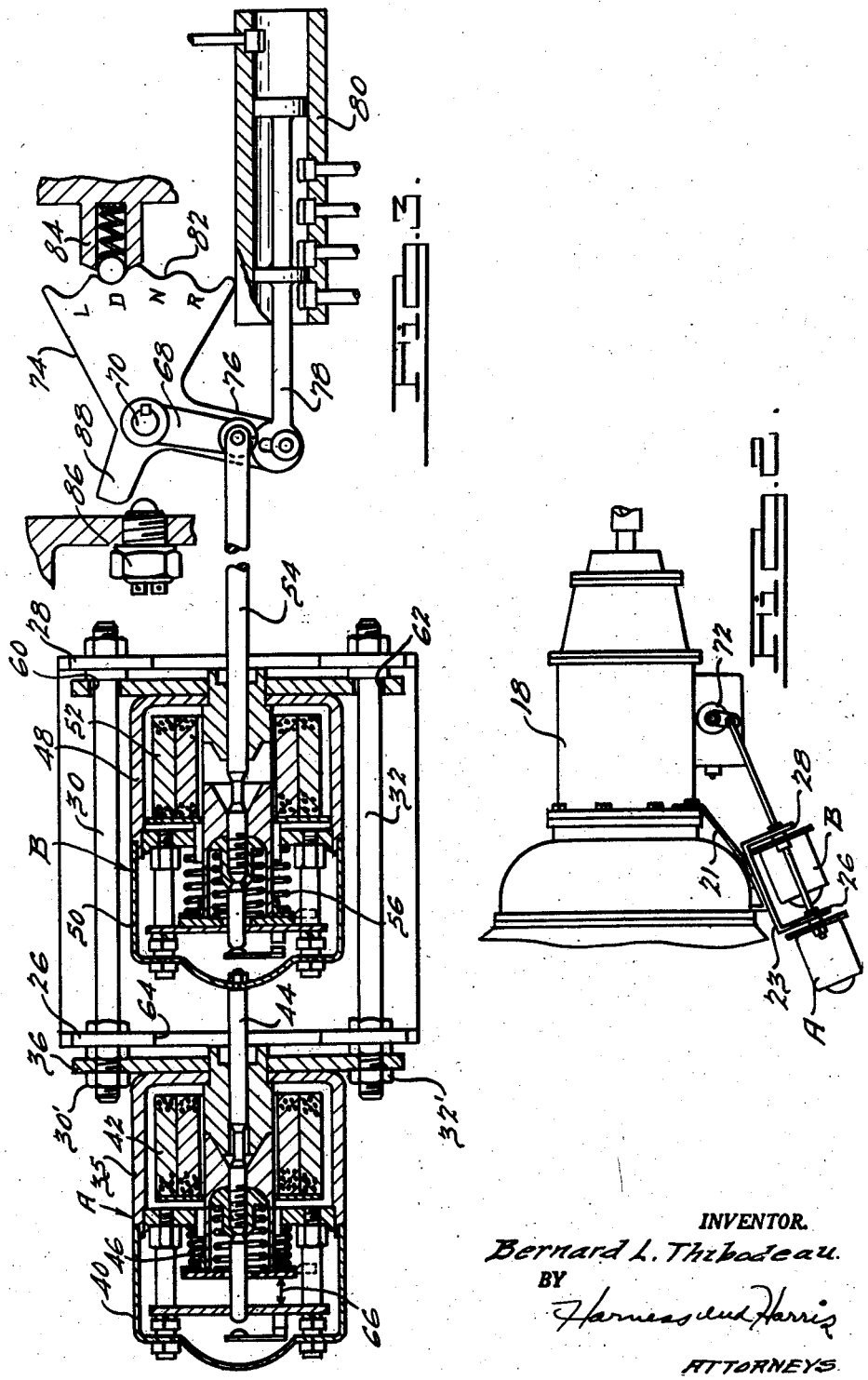
INVENTOR.
Bernard L. Thibodeau.
BY
Harness and Harris
ATTORNEYS.

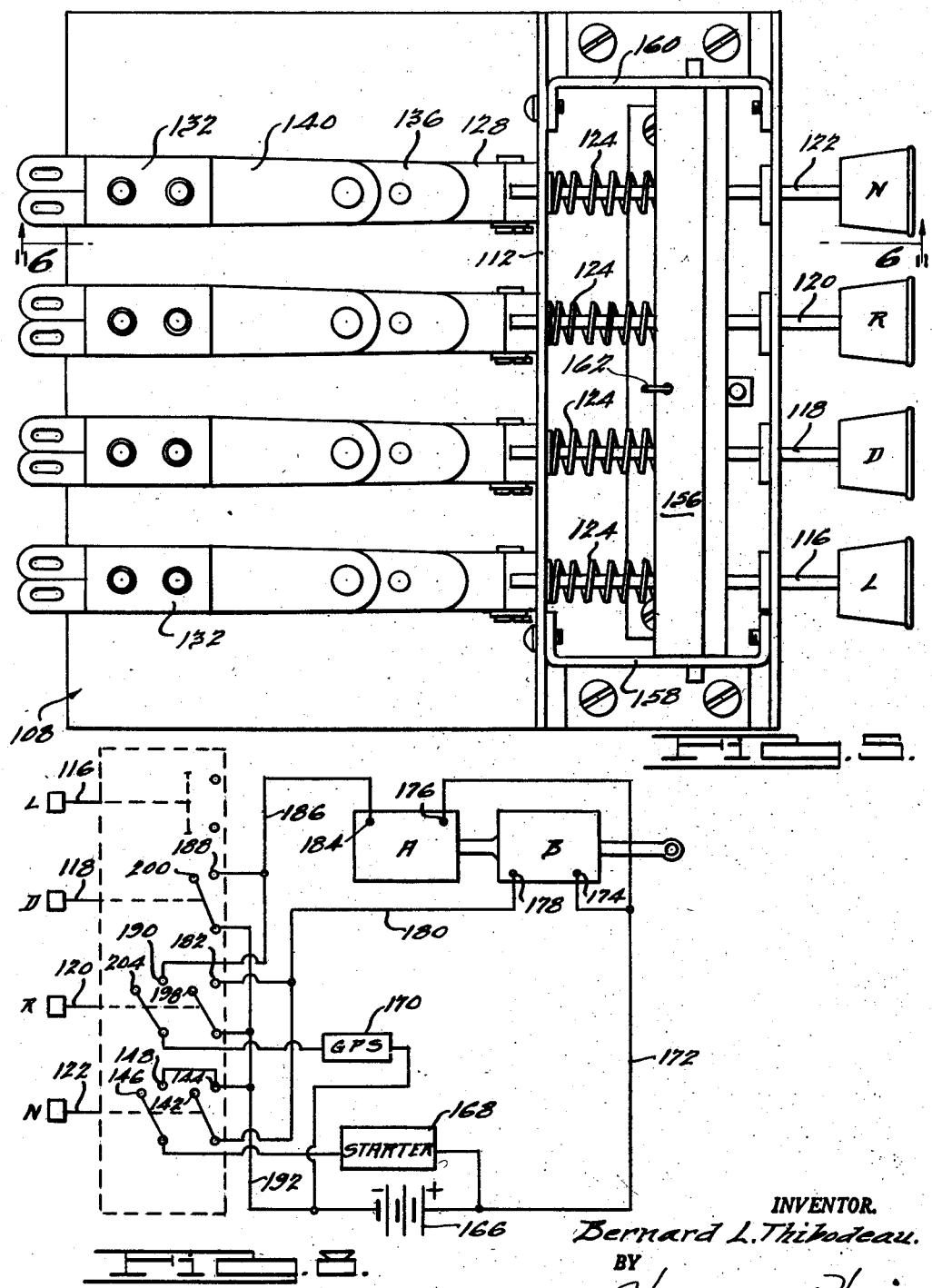

_United States Patent Office_

2,824,459
Patented Feb. 25, 1958

2,824,459

TRANSMISSION CONTROL APPARATUS

Bernard L. Thibodeau, Royal Oak, Mich., assignor to Chrysler Corporation, Highland Park, Mich., a corporation of Delaware Application July 3, 1956, Serial No. 595,719

6 Claims. (Cl. 74—365)

The present invention relates to electrical control systems and has particular reference to an improved system for a motor vehicle transmission.

In the past, vehicle transmissions have been controlled by mechanical linkage between the passenger compartment and the transmission. A principal object of the present invention is to provide an improved electrical control to thereby eliminate the mechanical linkage.

A further object of the invention is to provide an improved electrical control for a vehicle transmission wherein a relatively few number of parts are needed.

Another object of the present invention is to provide an improved vehicle transmission control which is economical as well as novel.

More particularly, the invention deals with an improved transmission control of an electrical nature wherein two solenoids connected in tandem effect movement of the transmission parts to four different positions. The controls for the solenoids preferably include a push button mechanism disposed adjacent the vehicle operator.

Other objects and advantages will become more apparent from the following description of one embodiment of my invention, reference being had to the accompanying drawings in which:

Fig. 1 is a fragmentary side elevation of a portion of a motor vehicle incorporating the transmission control apparatus to be described herein.

Fig. 2 is a plan view of the transmission housing and solenoids shown in Fig. 1.

Fig. 3 is a sectional view of a portion of the hydraulic transmission controls illustrated in the Ball application Serial No. 477,870, hereinafter set forth, in conjunction with a sectional view of the solenoids wherein the solenoids have been rotated 90° relative to the transmission controls to more clearly illustrate the invention.

Fig. 4 is a diagrammatic view of the four different combinations of positions of the solenoids.

Fig. 5 is a plan view of the electrical switching mechanism.

Fig. 6 is a sectional view taken on the line 6—6 of Fig. 5.

Fig. 7 is a view similar to Fig. 6 showing one of the levers in its applied position.

Fig. 8 is a schematic view of the electrical circuitry employing the invention.

In Fig. 1 a portion of a motor vehicle is illustrated as including a steering column 10, a fire wall 12, a floor pan 14, an instrument panel 16, and a transmission 18. An electrical control box 20 is supported on the instrument panel 16 and is provided with a plurality of selectively operable elements, one of which is shown at 22. A cable 24 containing a plurality of wires is operatively connected between the control box 20 and solenoids A and B, the latter being secured to the housing of the transmission by a bracket 21 and a V-shaped frame 23.

The solenoids A and B are mounted in axial alignment in a tandem fashion. The legs 26 and 28 of the frame 23 are connected by shafts 30 and 32, the latter having its ends threaded so that nuts 34 may secure the shafts in place.

As more clearly seen in Fig. 3, the front casing 35 of the solenoid A is secured to a mounting plate 36 by welding, press fitting or some other conventional manner. The mounting plate 36 is secured to the leg 26 on extensions of the shafts 30 and 32 by nuts 30' and 32'.

It should be noted at this point that the solenoids A and B are of the conventional type and a detailed description will not be given. Solenoid A includes the front casing 35, the rear casing 40, an energizing coil 42, a shaft 44, and a return spring 46. Similarly, the solenoid B includes a front casing 48, a rear casing 50, an energizing coil 52, a shaft 54, and a return spring 56. The front casing 48 of solenoid B is secured in a similar manner as the casing 35 to its mounting plate 58, the casing 35 being provided with openings 60 and 62 which receive the shafts 30 and 32 in a sliding relationship, respectively.

The output shaft 44 of the solenoid A extends through an opening 64 in the leg 26 of the frame 23, wherein its end extremity is secured to the rear casing 50 of the solenoid B. By this construction energization and deenergization of the solenoid A causes the shaft 44 to move the entire solenoid B along the tracks formed by the shafts 30 and 32. The distance that the solenoid B is moved in response to energization of solenoid A is indicated by the arrow 66.

The output shaft 54 of solenoid B is pivotally connected to lever 68, the latter being keyed to a vertically extending shaft 70, which extends into the interior of the transmission and is rotatably mounted in a boss 72 carried by the casing of the transmission. A lever plate 74 is provided with a laterally extending finger 76, which is operatively connected to a movable element 78 of a drive ratio selector valve 80. The drive ratio selector valve 80 is adapted to control the hydraulic control system of a transmission in the manner described in Jeremy T. Ball patent application, Serial No. 477,870, which was filed December 27, 1954, and reference may be made thereto for a description of the hydraulic control system and operative components of the transmission 18.

The rotatable lever plate 74 is preferably provided with a plurality of serrations 82, which are engaged by a spring detent mechanism 84 to retain the lever plate 74 in predetermined positions of the movable element 78 of the drive ratio selector valve 80. If desired, a switch 86 carried by the casing of the transmission 18 may be provided for cooperation with a finger 88 carried by the lever plate 74. The switch 86 is wired into the electrical circuit control of the engine starter so that the engine can be started only when the transmission is in neutral. More will be said about this switch construction when the electrical circuit of the invention is described.

By utilizing the present solenoid construction, it will be seen that the lever plate 74 may be moved to any one of the four positions indicated by the serrations at 82 thereon merely by energization and deenergization in various combinations of the solenoids A and B. The four serrations indicated at 82 on the lever plate 74 have been labelled "L" for low speed, "D" for drive, "N" for neutral, and "R" for reverse. In viewing Fig. 3, it will be noted that solenoid A is in its energized position while solenoid B is in its deenergized position. Attention is now directed to Fig. 4 where a diagrammatical view illustrates the four combinations which may be utilized to provide a different selection of transmission control. In the upper illustration of Fig. 4, indicated by numeral 100, both solenoid A and solenoid B are deenergized, placing the transmission in the "low drive" condition. In the second illustration indicated by the arrow 102 in Fig. 4, solenoid A is energized while solenoid B is not, placing the transmission in the "drive position," as more particularly shown in Fig. 3. In the illustration indicated by the arrow 104 of Fig. 4, the solenoid A is deenergized while solenoid B is energized, thereby placing the transmission in the "neutral." This position is different from the former position in view of the fact that the stroke of solenoid B is approximately double that of solenoid A. In the illustration shown by the arrow 106 of Fig. 4, both solenoid A and solenoid B are energized and the transmission is moved to its "reverse" position. By the foregoing construction, it should be noted that when either one of the solenoids is deenergized the appropriate return spring maintains the shaft of the solenoid in a fixed position so that, for example when only solenoid A is energized, the connection of the shaft 44 of solenoid A through the solenoid B to the shaft 54 of solenoid B is tantamount to the same as if there was a solid connection between the shafts 44 and 54. Similarly when solenoid B is energized the shaft 44 of solenoid A holds solenoid B in a fixed position and allows only the shaft 54 of solenoid B to operate the lever 68 of the transmission to effect a change therein.

To effect the operation of solenoids A and B to thereby move the transmission parts to the various locations of low, drive, neutral, and reverse, there is described herein an electrical control system shown in schematic fashion in Fig. 8. Figs. 5, 6, and 7 illustrate a push button control mechanism which is disposed within the control box 20 and which may be conveniently operated by the driver of the vehicle. This push button mechanism, generally indicated by the numeral 108, includes a base 110 having spaced vertical supports 112 and 114, which receive four slidably mounted levers 116, 118, 120, and 122. Each of the levers is provided with a return spring 124 interposed between the vertical support 112 and a shoulder 126 on the lever. Each of the levers, as for example 122 in Figs. 6 and 7, are also provided with wedge member 128, which when moved into position engage a lower spring connector 130. The spring connector 130 is mounted on an insulator block 132 disposed at the opposite end of the base 110 from the levers. The spring connector 130 is connected to insulator 134, which is connected to another spring connector 136 so that movement of the former also causes movement in a similar direction of the latter. Disposed adjacent and over the connectors 130 and 136 are connectors 138 and 140, respectively. The connectors 130, 138, 136 and 140 are provided with contact elements 142, 144, 146, and 148, respectively. In viewing Fig. 7, it will be noted that upon movement of the lever 122 to its applied position, the wedge member 128 moves the connectors 130 and 136 upwardly so that the contacts 142 and 144 are closed and the contacts 146 and 148 are closed. Such a construction is, of course, what is commonly referred to as a double pole, single throw switch, and further reference to this switch will be incorporated when a description of the schematic diagram in Fig. 8 is set forth. Before proceeding further, however, it should be noted that only levers 120 and 122 operate a double pole, single throw switch and that lever 118 operates only a single pole, single throw switch by merely eliminating or not connecting the top set of connectors. In a similar fashion, lever 116 is no switch at all, but merely acts to disconnect the other levers.

The connection and disconnection of the levers is accomplished by the following construction: A description of lever 122, as shown in Figs. 6 and 7, will suffice for all of the levers since they are all the same. The lever 122 is provided with an enlarged central portion 150 which has on its upper edge a pair of space V-shaped notches 152 and 154. Disposed transversely across the push button mechanism 108 is a bar 156, which is pivotally mounted in end supports 158 and 160, the latter being secured between the vertical supports 112 and 114. When each of the levers, as for example lever 122, is in its unapplied position, the lower corner of the bar 156 is held in the V-shaped notch 152 by the spring 162. When, however, any one of the levers is moved leftwardly, as viewed in Figs. 6 and 7, to its applied position the bar 156 is pivoted first clockwise and then counterclockwise into the notch 154 to maintain the levers, as for example lever 122 in Fig. 6 in its applied position. During this movement, however, when the bar 156 is pivoted to its furtherest clockwise position by riding up the shoulder 170 of the enlarged portion 150, any levers that are in their applied positions are released and the lever presently being applied is the only one that remains in an applied position, the spring 162 maintaining the newly applied lever in its applied position. Fig. 5 illustrates a plan view of the push button control mechanism wherein none of the levers are in their applied position.

In Fig. 8 there is shown a schematic diagram of a suggested electrical circuitry. Like numbers have been applied to like parts even though their electrical symbols are different than their physical appearance. For example, outlined by dashed lines at 108 is the push button control mechanism including "Low" lever 116, "Drive" lever 118, "Reverse" lever 120, and "Neutral" lever 122. Also included in the diagram are the solenoids A and B, the vehicle battery 166, the vehicle starter 168, and a "governor pressure switch" 170, the function of which hereinafter will be set forth.

The positive side of the battery 166 is connected through conductor means 172 to terminal 174 of solenoid B and terminal 176 of solenoid A. The other terminal 178 of solenoid B is connected through conductor means 180 to stationary contact 182 associated with "Reverse" lever 120 and to movable contact 142 associated with "Neutral" lever 122. The other terminal 184 of solenoid A is connected through conductor means 186 to stationary contact 188 associated with "Drive" lever 118 and to stationary contact 190 associated with "Reverse" lever 120. The negative side of the battery 166 is connected through conductor means 192 to stationary contacts 148 and 144 associated with "Neutral" lever 122, movable contact 198 associated with "Reverse" lever 120, and to movable contact 200 associated with "Drive" lever 118. The starter 168 is interconnected between the positive side of the battery 166 and movable contact 146 associated with "Neutral" lever 122. The governor pressure switch 170 is interconnected between the negative side of the battery and the movable contact 204 associated with "Reverse" lever 120.

In describing the electrical operation of the invention schematically shown in Fig. 8, it should be kept in mind that when each lever is moved to its applied position, any other lever that was in its applied position is released to its unapplied position.

In operation application of "Low" lever 116 effects no energization of either solenoid A or B; therefore, the solenoids take the position shown at 100 in Fig. 4. When "Drive" lever 118 is depressed contacts 188 and 200 are closed and solenoid A is energized to thereby effect the positioning shown at 102 in Fig. 4. When the "Neutral" lever 122 is depressed contacts 142 and 144 are closed to thereby energize solenoid B so that the position of the solenoids will take the form shown at 104 in Fig. 4. The contacts 146 and 148 are also closed when the "Neutral" lever is depressed, thereby applying power from the battery to the starter 168 so that the starter can only be used when the transmission is in the "Neutral" position.

It should be noted at this point that two provisions have been made to make sure that the engine can be started only when in neutral. Either one or both may be used. The first is the switch 86 associated with the lever 74, as shown in Fig. 3. The second is the electrical connection described in the last paragraph relative to the switches associated with "Neutral" lever 122 in the push button mechanism 108. The switch 86 has not been shown in Fig. 8 and, of course, the electrical connections concerning the starter shown in Fig. 8 have not been shown in Fig. 3.

When "Reverse" lever 120 is depressed contacts 198 and 182 are closed energizing solenoid B and contacts 204 and 190 are closed energizing solenoid A to thereby position the solenoids as shown at 106 in Fig. 4. It will be noted, however, that in order to energize solenoid A in this position current must pass through the "governor pressure switch" 170. The purpose of this switch is to prevent the operator from shifting the vehicle into reverse while it is going forward at any speed over, for example, five miles per hour. The switch 170 is responsive to the vehicle speed and remains electrically open at all speeds over a predetermined speed. As a result, the vehicle must be going slower than this predetermined speed for both solenoids A and B to be energized and reverse position reached. In the event the "Reverse" lever 120 is depressed when the vehicle is travelling forward at a speed exceeding the governor speed set on the switch 170, only solenoid B will be energized and the transmission will go into "Neutral" position as heretofore described until the speed of the vehicle comes down below the governor speed at which time solenoid A will also be energized and the reverse setting of the transmission, as shown at 106 in Fig. 4, will be accomplished.

Although I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a vehicle having a source of electrical energy and a transmission having a control member which is selectively movable to a plurality of positions to establish respectively different driving ranges of the transmission, a control apparatus for said member comprising a device located within the reach of the operator of the vehicle and having a plurality of manually operable members each movable from an inoperative to an operative position to select one driving range of said transmission differing from the driving range selected by operation of another of said manually operable members, first and second axially aligned solenoids electrically connected to said source and to said device, and means fixedly mounting said first solenoid and slidably mounting said second solenoid, said first solenoid having an output shaft operatively connected to said second solenoid so that energization and deenergization of said first solenoid will slidably move said second solenoid relative thereto, said second solenoid having an output shaft operatively connected to said control member, said manually operable members being movable to operative positions to energize and deenergize said first and second solenoids in predetermined combinations to thereby move said control members to said predetermined driving ranges of said transmission.

2. In a vehicle having a source of electrical energy and a transmission having a control member which is selectively movable to a plurality of positions to establish respectively different driving ranges of the transmission, a control apparatus for said member comprising electrical switching means located within the reach of the operator of the vehicle, first and second axially aligned solenoids electrically connected to said source and to said switching means, and means fixedly mounting said first solenoid and slidably mounting said second solenoid, said first solenoid having an output shaft operatively connected to said second solenoid so that energization and deenergization of said first solenoid will slidably move said second solenoid relative thereto, said second solenoid having an output shaft operatively connected to said control member, said electrical switching means being movable to operative positions to energize and deenergize said first and second solenoids in predetermined combinations to thereby move said control members to said predetermined driving ranges of said transmission.

3. In a vehicle having a source of electrical energy and a transmission having a control member which is selectively movable to a plurality of positions to establish respectively different driving ranges of the transmission, a control apparatus for said member comprising electrical switching means located within the reach of the operator of the vehicle and having a plurality of manually operable members each movable from an inoperative to an operative position to select one driving range of said transmission differing from the driving range selected by operation of another of said manually operable members, first and second axially aligned solenoids electrically connected to said source and to said switching means, and means fixedly mounting said first solenoid and slidably mounting said second solenoid, said first solenoid having an output shaft operatively connected to said second solenoid so that energization and deenergization of said first solenoid will slidably move said second solenoid relative thereto, said second solenoid having an output shaft operatively connected to said control member, said manually operable members being movable to operative positions to energize and deenergize said first and second solenoids in predetermined combinations to thereby move said control members to said predetermined driving ranges of said transmission.

4. The subject matter of claim 3, including a governor operated switch responsive to the vehicle speed connected between said source and a portion of said electrical switching means controlled by one of said manually operable members to thereby effect the operation of one of said solenoids when said vehicle exceeds a predetermined speed.

5. In a vehicle having a source of electrical energy and a transmission provided with a control member which is selectively movable to a plurality of positions to establish respectively different driving ranges of the transmission, switch means carried by said vehicle, solenoid means carried by said vehicle and having a movable portion operatively connected to said control member, and circuit means interconnecting said switch means, said solenoid means and said source so that operation of said switch means selectively energizes and deenergizes said solenoid means to effect movement of said control member to establish said different driving ranges of the transmission, said solenoid means including first and second solenoids arranged in a tandem manner wherein said first solenoid is fixed and said second solenoid is shiftable in response to energization and deenergization of said first solenoid.

6. In a vehicle having a source of electrical energy and a transmission provided with a control member which is selectively movable to a plurality of positions to establish respectively different driving ranges of the transmission, switch means carried by said vehicle, solenoid means carried by said vehicle and having a movable portion operatively connected to said control member, and circuit means interconnecting said switch means, said solenoid means and said source so that operation of said switch means selectively energizes and deenergizes said solenoid means to effect movement of said control member to establish said different driving ranges of the transmission, said solenoid means including first and second solenoids having first and second movable shafts extending therethrough respectively, wherein the stroke of one of said shafts is longer than the stroke of the other.

References Cited in the file of this patent

UNITED STATES PATENTS

| | | |
|---|---|---|
| 925,270 | Beemer | June 15, 1909 |
| 1,115,877 | Underhill | Nov. 3, 1914 |
| 1,279,767 | Schoenbein | Sept. 24, 1918 |
| 1,315,255 | Stortz | Sept. 9, 1919 |
| 2,256,929 | Sugarwater | Sept. 23, 1941 |